United States Patent [19]
Rapp et al.

[11] Patent Number: 6,034,014
[45] Date of Patent: Mar. 7, 2000

[54] GLASS FIBER COMPOSITION

[75] Inventors: Charles F. Rapp; Stephanie M. Mattson, both of Newark, Ohio

[73] Assignee: Owens Corning Fiberglas Technology, Inc., Summit, Ill.

[21] Appl. No.: 08/905,494

[22] Filed: Aug. 4, 1997

[51] Int. Cl.[7] ............................. C03C 13/00; C03C 3/091
[52] U.S. Cl. ............................... 501/35; 501/36; 501/66; 65/376; 65/454
[58] Field of Search .............................. 501/35, 36, 66; 65/454, 376

[56] References Cited

U.S. PATENT DOCUMENTS

| | | | |
|---|---|---|---|
| Re. 29,388 | 9/1977 | Atkinson | 106/50 |
| Re. 35,557 | 7/1997 | Thelohan et al. | 501/11 |
| 1,913,242 | 6/1933 | McClure . | |
| 2,192,939 | 3/1940 | Slayter et al. . | |
| 2,308,857 | 1/1943 | Bowes | 106/50 |
| 2,426,472 | 8/1947 | Stanworth | 106/54 |
| 2,877,124 | 3/1959 | Welsch | 501/35 |
| 2,882,173 | 4/1959 | Welsch | 106/50 |
| 3,008,841 | 11/1961 | Tiede | 106/54 |
| 3,013,888 | 12/1961 | de Lajarte | 106/50 |
| 3,060,041 | 10/1962 | Loewenstein | 106/50 |
| 3,151,966 | 10/1964 | Slayter | 65/22 |
| 3,328,142 | 6/1967 | Lévecque | 65/4 |
| 3,513,002 | 5/1970 | Labino | 106/50 |
| 3,736,162 | 5/1973 | Chvalovsky et al. | 106/99 |
| 3,753,674 | 8/1973 | Ohlberg et al. | 65/114 |
| 3,764,283 | 10/1973 | Hagedorn | 65/33 |
| 3,817,764 | 6/1974 | Wolf | 106/50 |
| 3,853,569 | 12/1974 | Laurent et al. | 106/50 |
| 3,922,155 | 11/1975 | Broemer et al. | 65/33 |
| 3,981,736 | 9/1976 | Broemer et al. | 106/39.6 |
| 4,090,882 | 5/1978 | Rauschenfels | 106/99 |
| 4,106,946 | 8/1978 | Ritze | 106/52 |
| 4,120,730 | 10/1978 | Trojer et al. | 106/39.6 |
| 4,131,597 | 12/1978 | Blüethgen et al. | 260/42.18 |
| 4,142,907 | 3/1979 | Manring et al. | 106/52 |
| 4,159,358 | 6/1979 | Hench et al. | 427/318 |
| 4,171,544 | 10/1979 | Hench et al. | 3/1.9 |
| 4,177,077 | 12/1979 | Gagin | 106/50 |
| 4,179,300 | 12/1979 | Sagara | 106/47 Q |
| 4,189,325 | 2/1980 | Barrett et al. | 106/35 |
| 4,234,972 | 11/1980 | Hench et al. | 3/1.9 |
| 4,239,113 | 12/1980 | Gross et al. | 206/568 |
| 4,243,421 | 1/1981 | Kume | 106/50 |
| 4,264,131 | 4/1981 | Sawamura et al. | 350/96.34 |
| 4,277,286 | 7/1981 | Boyd et al. | 106/52 |
| 4,312,952 | 1/1982 | Carbol | 501/36 |
| 4,325,724 | 4/1982 | Froberg | 65/121 |

(List continued on next page.)

FOREIGN PATENT DOCUMENTS

| | | |
|---|---|---|
| 0 135 449 | 3/1980 | European Pat. Off. . |
| 0 009 418 | 4/1980 | European Pat. Off. . |
| 0 019 600 | 11/1980 | European Pat. Off. . |
| 0 206 726 | 12/1986 | European Pat. Off. . |
| 0 247 817 | 12/1987 | European Pat. Off. . |
| 0 319 578 | 6/1989 | European Pat. Off. . |
| 0 399 320 A1 | 11/1990 | European Pat. Off. . |
| 0 412 878 | 2/1991 | European Pat. Off. . |
| 0 586 797 A1 | 3/1994 | European Pat. Off. . |
| 0 588 251 A1 | 3/1994 | European Pat. Off. . |
| 0 591 696 A1 | 4/1994 | European Pat. Off. . |
| 0 459 897 B1 | 4/1995 | European Pat. Off. . |
| 0 739 862 A2 | 10/1996 | European Pat. Off. . |
| 1.149.289 | 12/1957 | France . |
| 2 393 020 | 6/1978 | France . |
| 2 521 547 | 2/1983 | France . |
| 2 548 658 | 7/1984 | France . |
| 2 658 182 | 2/1990 | France . |
| 2 690 438 | 4/1992 | France . |
| 39 17 045 A1 | 11/1990 | Germany . |
| 44 06 923 A1 | 8/1995 | Germany . |
| 72-117753 | 11/1972 | Japan . |
| 73-101799 | 9/1973 | Japan . |
| 73-130550 | 11/1973 | Japan . |
| 54-148808 | 11/1979 | Japan . |
| 60-155551 | 8/1985 | Japan . |
| 63-14989 | 4/1988 | Japan . |
| 5-77623 | 3/1993 | Japan . |
| 6-116114 | 4/1994 | Japan . |
| 80-2913604 | 2/1980 | U.S.S.R. . |
| 86-4071881 | 5/1986 | U.S.S.R. . |
| 1351896 | 11/1987 | U.S.S.R. . |
| 1 726 411 A1 | 9/1989 | U.S.S.R. . |
| 811243 | 11/1956 | United Kingdom . |
| 1096465 | 12/1964 | United Kingdom . |
| 2 041 910 | 9/1980 | United Kingdom . |
| 2 080 281 | 2/1982 | United Kingdom . |
| 2 178 422 | 2/1987 | United Kingdom . |

(List continued on next page.)

OTHER PUBLICATIONS

Nomenclature Committee of TIMA, Inc., "Nonmenclature of Man–Made Vitreous Fibers," Apr. 15, 1991, pp. 1–72.
Stephanie M. Mattson, "Glass Fiber Dissolution in Simulated Lung Fluid and Measures Needed to Improve Consistency and Correspondence to In Vivo Dissolution," vol. 102, Supplement 5, Oct. 1994, pp. 87–90.

(List continued on next page.)

Primary Examiner—Michael Marcheschi
Attorney, Agent, or Firm—Inger H. Eckert; Stephen W. Barns

[57] ABSTRACT

The glass compositions of the present invention contain at least 2.0 wt % $Al_2O_3$ to give resulting glass fiber an acceptable chemical durability for product performance, but no more than 3.0 wt % to ensure the fiber maintains a relatively high biosolubility. The compositions further include relatively high amount of $Na_2O+K_2O+MgO+CaO$, which tends to increase fiber biosolubility and allows for the use of reduced amounts of $B_2O_3$ in the composition. The glass compositions have KI values that generally equal or exceed a KI value of 40 and are suitable for rotary processing. The compositions have liquidus temperatures below about 1800° F. and viscosities above 300 Poise at the liquidus temperature. For higher $B_2O_3$ compositions the liquidus temperatures are below 1650° F., and the viscosities are above 1,000 Poises at the liquidus temperatures.

21 Claims, No Drawings

U.S. PATENT DOCUMENTS

| | | | |
|---|---|---|---|
| 4,381,347 | 4/1983 | Carbol | 501/36 |
| 4,437,192 | 3/1984 | Fujiu et al. | 3/1.9 |
| 4,451,276 | 5/1984 | Barthe et al. | 65/6 |
| 4,454,238 | 6/1984 | Hobson et al. | 501/38 |
| 4,497,629 | 2/1985 | Ogino et al. | 433/201 |
| 4,552,850 | 11/1985 | Partington et al. | 501/37 |
| 4,562,161 | 12/1985 | Mennemann et al. | 501/59 |
| 4,604,097 | 8/1986 | Graves, Jr. et al. | 623/11 |
| 4,605,415 | 8/1986 | Richez | 623/16 |
| 4,608,350 | 8/1986 | Howard, Jr. | 501/20 |
| 4,615,988 | 10/1986 | Le Moigne et al. | 501/30 |
| 4,652,534 | 3/1987 | Kasuga | 501/5 |
| 4,652,535 | 3/1987 | Mackenzie et al. | 501/27 |
| 4,655,777 | 4/1987 | Dunn et al. | 623/16 |
| 4,756,732 | 7/1988 | Barthe et al. | 65/6 |
| 4,759,785 | 7/1988 | Barthe et al. | 65/6 |
| 4,759,974 | 7/1988 | Barthe et al. | 428/224 |
| 4,768,859 | 9/1988 | Kasori et al. | 350/96.34 |
| 4,775,646 | 10/1988 | Hench et al. | 501/2 |
| 4,830,989 | 5/1989 | Trivedi et al. | 501/35 |
| 4,851,046 | 7/1989 | Low et al. | 106/35 |
| 4,867,779 | 9/1989 | Meunier et al. | 71/62 |
| 5,013,323 | 5/1991 | Kobayashi et al. | 623/16 |
| 5,037,470 | 8/1991 | Matzen et al. | 71/52 |
| 5,055,428 | 10/1991 | Porter | 501/35 |
| 5,108,957 | 4/1992 | Cohen et al. | 501/35 |
| 5,108,975 | 4/1992 | Schubert et al. | 502/224 |
| 5,120,340 | 6/1992 | Ducheyne et al. | 65/18.3 |
| 5,121,748 | 6/1992 | Ditz et al. | 128/631 |
| 5,206,100 | 4/1993 | Muto et al. | 429/247 |
| 5,215,563 | 6/1993 | LaCourse et al. | 65/2 |
| 5,250,488 | 10/1993 | Thelohan et al. | 501/36 |
| 5,296,026 | 3/1994 | Monroe et al. | 106/35 |
| 5,312,806 | 5/1994 | Mogensen | 501/36 |
| 5,332,698 | 7/1994 | Nyssen et al. | 501/35 |
| 5,332,699 | 7/1994 | Olds et al. | 501/35 |
| 5,346,864 | 9/1994 | Maugendre et al. | 501/35 |
| 5,401,693 | 3/1995 | Bauer et al. | 501/38 |
| 5,420,082 | 5/1995 | Maugendre et al. | 501/35 |
| 5,429,996 | 7/1995 | Kaneko | 501/35 |
| 5,523,264 | 6/1996 | Mattson | 501/35 |
| 5,523,265 | 6/1996 | Rapp et al. | 501/35 |
| 5,622,903 | 4/1997 | Rapp et al. | 501/35 |

FOREIGN PATENT DOCUMENTS

| | | |
|---|---|---|
| 2 220 654 | 1/1990 | United Kingdom |
| 2 279 942 | 1/1995 | United Kingdom |
| WO 86/04807 | 8/1986 | WIPO |
| WO 87/05007 | 8/1987 | WIPO |
| WO 89/12032 | 12/1989 | WIPO |
| WO 90/02713 | 3/1990 | WIPO |
| WO 91/11403 | 8/1991 | WIPO |
| WO 92/05121 | 4/1992 | WIPO |
| WO 92/09536 | 6/1992 | WIPO |
| WO 93/07741 | 4/1993 | WIPO |
| WO 93/15028 | 8/1993 | WIPO |
| WO 93/22251 | 11/1993 | WIPO |
| WO 94/14717 | 7/1994 | WIPO |
| WO 94/14718 | 7/1994 | WIPO |
| WO 94/15883 | 7/1994 | WIPO |
| WO 94/18134 | 8/1994 | WIPO |
| WO 95/01941 | 1/1995 | WIPO |
| WO 95/12554 | 5/1995 | WIPO |
| WO 95/21799 | 8/1995 | WIPO |
| WO 95/29135 | 11/1995 | WIPO |
| WO 95/32926 | 12/1995 | WIPO |
| WO 95/32927 | 12/1995 | WIPO |
| WO 95/34514 | 12/1995 | WIPO |
| WO 95/35265 | 12/1995 | WIPO |
| WO 96/00196 | 1/1996 | WIPO |
| WO 96/01793 | 1/1996 | WIPO |
| WO 96/04213 | 2/1996 | WIPO |
| WO 96/30313 | 10/1996 | WIPO |
| WO 96/34836 | 11/1996 | WIPO |
| WO 97/49643 | 12/1997 | WIPO |

OTHER PUBLICATIONS

Stephanie M. Mattson, "Glass Fibres in Simulated Lung Fluid: Dissolution Behavior and Analytical Requirements," Ann. Occup. Hyg., vol. 38, No. 6, 1994, pp. 857–877 (No Month).

"Biological Effects of Man–Made Mineral Fibres," vol. 2, Sessions VI–IX and annexes, Apr. 20–22, 1982, pp. 26–99 and Figs. 3–4.

Chemical Abstracts, vol. 84, 1976. p. 306 (No month).

Dr. h.c. Werner Lehnhäuser, "Glasuren und ihre Farben," 1973 Wilheim Knapp Verlag, pp. 50–51, 14–15, 56–57, 70–71, and 10–11 (No Month).

N.K. Mitra, M. Mukherjee and M. Samanta, "Effect of Minor Substitution of $SiO2$ in the $Na2O–SiO2$ Glass on the Leaching Characteristics in Aqueous Medium," vol. 13, No. 4, Jul. 1968, pp. 98–102

"Scientific Basis for Nuclear Waste Management VII," Materials Research Society Symposia Proceedings, Nov. 1983, vol. 26, pp. 755–761.

Hironori Ohta and Yoshiro Suzuki, "Chemical Durability of Glasses in the Systems $SiO_2$–$CaO$–$Na_2O$–$Na_2O$–$R_mO_n$," Ceramic Bulletin, vol. 57, No. 6, 1978, pp. 602–604 (No Month).

V.R. Christensen, S. Lund Jensen, M. Guldberg, and O. Kamstrup, "Effect of Chemical Composition of Man–Made Vitreous Fibers on the Rate of Dissolution In Vitro at Different pHs," vol. 102, Supplement 5, Oct. 1994, pp. 83–86.

Örjan H. Andersson, Kaj H. Karlsson, Kan Kangasniemi, Anti Yli–Urpo, "Models for Physical Properties and Bioactivity of Phosphate Opal Glasses," Glastech. Ber. 61 (1988) Nr. 10, pp. 300–304 (No Month).

G.A. Cox, B.A. Ford, "The Corrosion of Glass on the Sea Bed," Journal of Materials Science 24 (1989) pp. 3146–3153 (No Month).

F. Pott, et al., "Nato Advanced Research Workshop on Mechanisms in Fibre Carcinogenesis", Albuquerque, NM, Oct. 22–25, 1990, pp. 1–6.

B. Bellmann, et al., "Study on the Durability of Chemically Different Glass Fibres in Lungs of Rats", Zbl. Hyg. 190, (1990), pp. 310–314 (No Month).

F. Pott, et al., "Carcinogenicity of Glass Fibres with Different Durability", Zbl. Hyg., 189, (1990), pp. 563–566 (No Month).

R. Potter and Stephanie M. Mattson, "Glass Fiber Dissolution in a Physiological Saline Solution", Glastechnische Berichte 64(1991) Jan., No. 1, Frankfurt, DE, pp. 16–28.

Draft "TRGS 906", "Justification for the Classification of Types of Inorganic Fibre Dust (Excluding Asbestos)," pp. 1–28 Date (Unknown).

"Inorganic Fibers", C.Z. Carroll–Potczynski, 1958, p. 125, U.S. Bureau of Mines (No Month).

"Erfahrungsaustausch", Martin Hübacher, Siikattechn, 20, 1960, No. 2, pp. 88–90 (No Month).

Jon F. Bauer, "Solubility and Durability of Manmade Mineral Fibers in Physiological Fluids", Presented at TAPPI Non–wovens Conference, Nashville, Ohio, 1988. pp. 1–8 (No Month).

Z. M. Syritakaya et al., *Glasses Free from Alkali and Borates for Machine Working*, Institute of Glass, p. 289 (Date Unknown).

Thomas D. Callinan and Robert T. Lucas, "Some Special Fiber Glass Compositions," *Research Disges*, Oct. 1954.

C.R. Das and R.W. Douglas, "Studies on the Reaction Between Water and Glass. Part 3," Physics and Chemistry of Glasses, vol. 8, No. 5, Oct. 1967, pp. 178–184.

C.M. Jantzen and M.J. Plodinec, "Thermodynamic Model of Natural, Medieval and Nuclear Waste Durability," Journal of Non–Crystalline Solids 67, 1984, pp. 207–223 (No Month).

6,034,014

GLASS FIBER COMPOSITION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is directed generally to glass compositions, and more particularly to glass fiber compositions having high KI values and structural durability.

Glass fiber, or fiberglass, insulation is well known and has been a commercial product for many years. Glass fiber insulation is widely used both residentially and commercially.

Generally, the insulation is made from intertwined soda lime alumina borosilicate glass fibers which are held together with a binder. The glass fibers are generally produced using $SiO_2$ with a number of additives, such as $Na_2O$, $K_2O$, $CaO$, $MgO$, $BaO$, $B_2O_3$, and $Al_2O_3$, that enhance various properties of fibers. The binder may be any suitable material, but quite commonly is a phenol-formaldehyde resin or a urea formaldehyde resin.

A rotary process is often used to form the glass fibers. The rotary process typically involves the introduction of molten glass into a rotating device, called a spinner, which contains a plurality of holes circumferentially distributed around the spinner. The spinner is rotated about an axis to produce a centrifugal force on the molten glass. The rotation of the spinner forces the molten glass through the plurality of holes.

An annular stream of hot gases is passed around the spinner to contact and attenuate the fibers passing through the holes. A spray nozzle is positioned to coat the attenuated fibers with the binder.

A conveyer collects the binder-coated fibers in the form of a blanket, or batt, and the blanket is heat cured to produce the final insulation. The rotary process can be used to produce insulation having different densities by varying the conveyer speed and the thickness of the cured insulation.

Glass fiber insulation has been used to replace, or in lieu of, asbestos fiber insulation in many applications. It is generally believed that asbestos fibers, when inhaled, can result in significant disease in man. Though the exact mechanism responsible for the biological activity of asbestos fibers is unknown, it is widely believed that an important factor in the mechanism is the residence time of the fibers in the lungs.

Unlike asbestos fibers, glass fibers have not been linked to disease in man. Glass fiber also appears to have a much shorter residence time in the lungs than asbestos fibers.

The residence time of glass fibers in the lungs will depend, at least in part, upon chemical dissolution of the fiber. The rate of chemical dissolution of a material in biological fluid is generally referred to as the biosolubility or biological degradability of the material.

Despite the lack of a link between glass fibers and human disease, some countries, for example Germany, have proposed regulations for the use of glass fibers in insulation products. Glass fiber compositions that meet the standard in the proposed regulations are considered to be free of suspicion as a disease causing agent and can be used for both commercial and residential installations.

The regulations are based on a desire to minimize the residence time of the glass fiber in the lungs. It is a hope that minimizing the residence time of the glass fiber will decrease the possibility, if any, of subsequent disease.

The proposed German regulations for biosolubility require that glass fibers have a numerical index (KI) greater than or equal to 40 to be considered to be free of suspicion. The KI index, which is sometimes referred to as the Wardenbach Index, is described by the equation:

$$KI = \Sigma(Na_2O, K_2O, CaO, MgO, BaO, B_2O_3) - 2(Al_2O_3)$$

where the values for each oxide correspond to the weight percentage of that oxide in the glass composition.

The index used in the regulation places severe constraints on the compositions of the glass, expressly on the levels of alumina ($Al_2O_3$) and implicitly on the level of silica ($SiO_2$) in the glass composition. Manufacturers must now produce glass fibers which meet the proposed regulations, while maintaining standard performance criteria for the products. The criteria include that the glass fiber must be producible using standard wool processes, have sufficient durability in use, and acceptable insulating properties.

Silica is the primary component in glass fiber and provides most of the structural and physical properties of the fiber. Alumina is primarily used in the fiber to provide additional durability to the fiber.

Initial attempts to produce glass fiber that complies with the regulations involved using reduced levels of alumina in the glass composition to increase the KI index. However, low alumina glass fibers tend to have poor durabilities.

A number of glass composition have been reported as having improved biosolubility or biodegradability. For example, Potter, U.S. Pat. No. 5,055,428, Cohen et al., U.S. Pat. No. 5,108,957, Nyssen, U.S. Pat. No. 5,332,698, and Bauer et al., U.S. Pat. No. 5,401,693, all describe glass fibers having improved biosolubility. Also, published PCT applications WO 95/31411, WO 95/32925, WO 95/32926, WO 95/32927, and WO 95/35265 and numerous published German applications have reported glass compositions having increased biodegradability.

Despite the improvements presented in the aforementioned patents and applications, the glasses failed to meet the $KI \geq 40$ standard or significant processing and performance problems remain. The decreased performances and increased processing costs for glass compositions designed to meet the new biological standards is a clear shortcoming in the industry. In addition, higher alumina compositions of the prior art provide performance versatility, yet are either not acceptable in the emerging regulated marketplace or suffer from increased processing costs. Accordingly, there is still a need for a glass composition which has increased biosolubilities (KI value $\geq 40$), while possessing acceptable processing properties, such as viscosity and liquidus temperatures, as well as acceptable performance and durability in use.

BRIEF SUMMARY OF THE INVENTION

The above objectives and others are accomplished by glass compositions in accordance with the present invention. The glass compositions contain at least 2.0 wt % $Al_2O_3$ to give resulting glass fiber an acceptable chemical durability for product performance, but no more than 3.0 wt % to ensure the fiber maintains a relatively high biosolubility. The compositions further include relatively high amount of $Na_2O+K_2O+MgO+CaO$, which tends to increase fiber biosolubility and allows for the use of reduced amounts of $B_2O_3$ in the composition.

The glass compositions have KI values that generally equal or exceed a KI value of 40 and are suitable for rotary processing. The compositions have liquidus temperatures below about 1800° F., and have viscosities above 300 Poise at the liquidus temperatures.

In one aspect of the invention glasses are formulated with relatively high amounts of $B_2O_3$ and low amounts of CaO+MgO. The high $B_2O_3$ glasses were found to have very low liquidus temperatures (<1650° F.) and higher viscosities (>1,000 Poise) at the liquidus temperature.

In another aspect of the invention, glasses are formulated with relatively low amounts of $B_2O_3$ and high amounts of CaO+MgO. The low $B_2O_3$ glasses were found to have slightly higher liquidus temperatures but still sufficiently low to be formed into fibers by the rotary process (liquidus temperatures <1800° F., and viscosities at the liquidus temperature >300 Poise).

In some situations the low $B_2O_3$/high (CaO+MgO) glasses are highly advantageous. For example, lower amounts of $B_2O_3$ can result in significantly lower batch costs.

Also, the lower $B_2O_3$ level in the composition can result in lower volatile emissions both during melting and forming. When formed by the rotary process, the lower viscosity low $B_2O_3$ glasses can be extruded through the spinner holes and attenuated without significant reheating of the fibers.

In another aspect of the invention, glasses are formulated with low amounts of MgO, generally below about 3.0 to 3.5 wt % have significantly improved chemical durabilities with respect to water. These compositions provide for an improved product performance in addition to improved biosolubility.

In another aspect of the invention, glasses are formulated with higher amounts of MgO, generally between about 2.0 and 6.0 wt %, and preferably between about 3.0 and 5.0 wt %. It was found that these glasses could be formulated with lower amounts of $B_2O_3$, while still maintaining an acceptable liquidus temperature and viscosity at the liquidus temperature. Advantages of these glasses include lower cost and less volatile emissions during melting and forming.

The compositions of the present invention provides glass compositions that meet proposed biosolubility standards, while maintaining acceptable performance and durability as glass fiber insulation. Accordingly, the present invention overcomes the aforementioned difficulties of the prior art in meeting both public health standards and commercial requirements. These advantages and others will become apparent from the following detailed description of the invention.

DETAILED DESCRIPTION OF THE INVENTION

The present invention will be described generally with reference to present preferred embodiments of the invention only for the purpose of providing examples of the invention and not for purposes of limiting the same.

The applicants have found that acceptable glass processing and fiber biosolubility and durability can be maintained in glass fiber by providing compositions including alumina in a range of 2–3%, $B_2O_3$ in the range of 6–15%, and increased levels of alkali and alkaline oxides over the prior art. Compositions of the present invention provide a balance between increased durability and biosolubility to address the shortcomings of the prior art.

The $SiO_2$ content in compositions of the present invention ranges from 49–54%. The present invention provides for lower levels of silica to provide for increased levels of additives that are used to improve the biosolubility and the durability of the resulting glass fibers.

The $Al_2O_3$ content in the composition should be approximately 2% or higher to provide sufficient performance durability. However, as the alumina content begins to exceed approximately 3%, the biosolubility of the composition will begin to deteriorate. It is preferable that the alumina content of the composition ranges from 2.1–2.9% and more preferably from 2.1–2.6% to provide a more balanced composition.

To compensate for the increased levels of alumina and its detrimental affect on the biosolubility, increased levels of alkali and alkaline oxides are included in the composition. Specifically, higher levels of MgO, CaO, $Na_2O$ and $K_2O$ can be used to improve the KI index and to lower the liquidus temperature of the compositions.

$Na_2O$ is included in an amount ranging from approximately 16–22% depending on the desired properties. $Na_2O$ will generally provide for lower viscosities and better melting characteristics for the glass. Preferably, the amount of $Na_2O$ ranges from 18–21% and more preferably from 19–21% in the composition. In this range, the amount of $B_2O_3$ in the composition can be reduced as further discussed within.

$K_2O$ is included in lower amounts, generally 0–2%, depending upon the amount of $Na_2O$ included in the composition. $K_2O$ at low levels tends to enhance the characteristics associated with $Na_2O$. For example, somewhat lower liquidus temperatures can be achieved without substantial quantities of $B_2O_3$, if the combined amount of $K_2O$ and $Na_2O$ is approximately 20% or higher.

MgO is included in the composition ranges from 0–8% to provide for somewhat lower liquidus temperatures and viscosities at a lower cost. When MgO is included in quantities less than approximately 3.5%, the resulting glass fibers have improved durability with respect to water.

In addition, when MgO is included in a range of about 2–6%, and more preferably 3–5%, the glass compositions can be formulated with lower $B_2O_3$ quantities. When formed by the rotary process, the lower viscosity low $B_2O_3$ glasses can be extruded through the spinner holes and attenuated without significant reheating of the fibers.

CaO is included in the composition in quantities ranging from 7–14%. The CaO provides for a lower viscosity and improved durability.

$B_2O_3$ is included in the composition in quantities ranging from 5.5–15%. The $B_2O_3$ primarily serves to significantly lower the liquidus temperature and the viscosity of the composition, but also provides durability in resulting fibers. The glass compositions formed with high concentration of $B_2O_3$, e.g. 13%, were found to have very low liquidus temperatures (<1650° F.) and higher viscosities (>1,000 Poise) at the liquidus temperature.

While including high concentrations of $B_2O_3$ in the glass compositions tends to increase the cost, high $B_2O_3$ glasses can be formed into fibers at quite low temperatures and at high viscosities. These forming conditions can greatly increase the spinner life which can compensate for the increased cost of the glass batch.

Prior art glass compositions conforming to the KI index regulations generally provide for increased levels of $B_2O_3$ to compensate in part for the increased levels of alumina. However, a disadvantage of including increased levels of $B_2O_3$ are higher costs associated with $B_2O_3$. Another disadvantage is that $B_2O_3$ is volatile and higher concentrations produce higher emissions that must be controlled, which can further lead to increased costs. For these reasons, it is preferred to limit the $B_2O_3$ content to 15%.

In view of the disadvantages associated with the various constituents included in glass compositions, the present invention attempts to balance the composition to provide for more versatile and better performing glass compositions.

The following examples are provided to demonstrate the present invention and not to limit the same.

EXAMPLES

A number of compositions were prepared by methods known in the art to provide examples of compositions of the present invention. For each sample, the liquidus temperature of the composition was determined. Also, the temperature at which the viscosity of the glass is approximately 1000 poise was determined. The viscosity at the liquidus temperature ($\eta_{TL}$) is shown for a number of compositions.

In addition, durability testing was performed on a number of samples. The durability test consisted of preparing 10 μm diameter continuous fibers from each composition. A 1 g sample of the fiber was placed in 100 ml of water and maintained at a temperature of 96° F. for 24 hours. Following the water exposure, the sample was removed from the water, dried and weighed. The post-test weight of the sample was compared to the pretest weight to calculate the % weight loss during testing.

| Constituent\Sample # | 1 | 2 | 3 |
|---|---|---|---|
| $SiO_2$ | 53.69 | 53.69 | 50.72 |
| $Al_2O_3$ | 2.0 | 2.0 | 3.0 |
| $B_2O_3$ | 10.0 | 8.0 | 11.9 |
| $Na_2O$ | 19.3 | 19.3 | 19.3 |
| $K_2O$ | 0.7 | 0.7 | 0.7 |
| MgO | 4.35 | 4.96 | 3 |
| CaO | 9.88 | 11.27 | 11.3 |
| $Fe_2O_3$ | 0.08 | 0.08 | 0.08 |
| KI Index | 40.23 | 40.23 | 40.20 |
| Liquidus Temperature $T_L$(° F.) | 1618 | 1707 | 1664 |
| Temp. @ $\eta$ = 1000 Poise | 1632 | 1643 | 1600 |
| $\eta_{TL}$(Poise) | 1,170 | 540 | |
| % weight loss | 4.12 | 4.11 | |

| Constituent\Sample # | 4 | 5 | 6 | 7 |
|---|---|---|---|---|
| $SiO_2$ | 53.42 | 53.42 | 53.42 | 53.42 |
| $Al_2O_3$ | 2.1 | 2.1 | 2.1 | 2.1 |
| $B_2O_3$ | 13.1 | 10.1 | 8.1 | 8.1 |
| $Na_2O$ | 19.3 | 19.3 | 19.3 | 19.3 |
| $K_2O$ | 0.7 | 0.7 | 0.7 | 0.7 |
| MgO | 3.0 | 3.0 | 5.0 | 3.0 |
| CaO | 8.3 | 11.3 | 11.3 | 13.3 |
| $Fe_2O_3$ | 0.08 | 0.08 | 0.08 | 0.08 |
| KI Index | 40.2 | 40.2 | 40.2 | 40.2 |
| Liquidus Temperature $T_L$(° F.) | 1511 | 1661 | 1712 | 1759 |
| Temp. @ $\eta$ = 1000 Poise | 1627 | 1630 | 1645 | 1639 |
| $\eta_{TL}$ (Poise) | | | | |
| % weight loss | 3.73 | 3.34 | 4.05 | |

| Constituent\Sample # | 8 | 9 | 10 | 11 |
|---|---|---|---|---|
| $SiO_2$ | 52.22 | 52.22 | 52.22 | 52.22 |
| $Al_2O_3$ | 2.5 | 2.5 | 2.5 | 2.5 |
| $B_2O_3$ | 13.9 | 10.9 | 8.9 | 5.9 |
| $Na_2O$ | 19.3 | 19.3 | 19.3 | 19.3 |
| $K_2O$ | 0.7 | 0.7 | 0.7 | 0.7 |
| MgO | 3.0 | 3.0 | 3.0 | 8.0 |
| CaO | 8.3 | 11.3 | 13.3 | 11.3 |
| $Fe_2O_3$ | 0.08 | 0.08 | 0.08 | 0.08 |
| KI Index | 40.2 | 40.2 | 40.2 | 40.2 |
| Liquidus Temperature $T_L$(° F.) | 1453 | 1667 | 1751 | 1793 |
| Temp. @ $\eta$ = 1000 Poise | 1620 | 1619 | 1626 | 1661 |
| $\eta_{TL}$ (Poise) | | | | |
| % weight loss | 3.44 | | | |

| Constituent\Sample # | 12 | 13 | 14 | 15 |
|---|---|---|---|---|
| $SiO_2$ | 53.69 | 53.69 | 53.69 | 53.69 |
| $Al_2O_3$ | 2.0 | 2.0 | 2.0 | 2.0 |
| $B_2O_3$ | 14.0 | 13.0 | 7.5 | 7.5 |
| $Na_2O$ | 19.3 | 19.3 | 17.3 | 21.3 |
| $K_2O$ | 0.7 | 0.7 | 0.7 | 0.7 |
| MgO | 3.13 | 3.43 | 5.73 | 4.51 |
| CaO | 7.10 | 7.80 | 13.0 | 10.22 |
| $Fe_2O_3$ | 0.08 | 0.08 | 0.08 | 0.08 |
| KI Index | 40.23 | 40.23 | 40.23 | 40.23 |
| Liquidus Temperature $T_L$(° F.) | 1411 | 1456 | 1791 | 1777 |
| Temp. @ $\eta$ = 1000 Poise | 1624 | 1624 | 1671 | 1616 |
| $\eta_{TL}$ (Poise) | 30,200 | 12,300 | 300 | |
| % weight loss | 3.65 | 4.24 | | |

| Constituent\Sample # | 16 | 17 | 18 |
|---|---|---|---|
| $SiO_2$ | 53.42 | 53.42 | 52.22 |
| $Al_2O_3$ | 2.1 | 2.1 | 2.5 |
| $B_2O_3$ | 16.1 | 13.1 | 13.9 |
| $Na_2O$ | 19.3 | 19.3 | 19.3 |
| $K_2O$ | 0.7 | 0.7 | 0.7 |
| MgO | 0 | 0 | 0 |
| CaO | 8.3 | 11.3 | 11.3 |
| $Fe_2O_3$ | 0.08 | 0.08 | 0.08 |
| KI Index | 40.2 | 40.2 | 40.2 |
| Liquidus Temperature $T_L$(° F.) | 1433 | 1627 | 1601 |
| Temp. @ $\eta$ = 1000 Poise | 1620 | 1613 | 1608 |
| $\eta_{TL}$ (Poise) | | | |
| % weight loss | 3.73 | 2.67 | |

As can be seen from the examples, compositions of the present invention provide for increased levels of alumina, while remaining within the proposed KI index biosolubility requirements and maintaining acceptable liquidus temperatures (<1800° F.) and viscosities. Theoretically acceptable compositions for rotary process glass fiber production appear to be possible with 2.5% alumina and as little as 5.9% $B_2O_3$.

In addition, the present invention provides for decreasing the amount of $B_2O_3$ used in glass compositions. Increased levels of alkaline and alkali oxides are used to partly compensate for the decreased amounts of $B_2O_3$ used in the present invention; thereby resulting in compositions that meet both the KI index regulations and can be processed by standard rotary methods.

The examples demonstrate that compositions within the present invention can be employed in various quantities to tailor specific properties of the compositions. Examples 1–3 show that compositions ranging from 2–3% $Al_2O_3$ and 8–11.9% $B_2O_3$ have acceptable liquidus temperatures and viscosities, when the high levels of alkali and alkaline oxides are used, (MgO+CaO)>14 and ($K_2O+Na_2O$)≧20.

Examples 4–7 show the effect of decreasing the amount of $B_2O_3$ and compensating for the decrease by increasing the MgO and/or CaO concentrations. It appears that at lower levels of $B_2O_3$, substituting MgO for $B_2O_3$ may provide for a lower liquidus temperatures than substituting CaO.

Examples 8–11 show the range of $B_2O_3$ concentrations with 2.5% $Al_2O_3$ that have properties within the theoretically acceptable range for rotary processing. Examples 12–15 show a similar comparison for 2.0% $Al_2O_3$.

Examples 16–18 show that substituting CaO for $B_2O_3$ at higher levels of $B_2O_3$ results in a composition with 2.0% $Al_2O_3$. Example 16 is included as a comparative example to demonstrate the unexpectedly increased durability, in addition to an acceptable liquidus temperature and viscosity of the composition of Example 17. The sample composition of Example 18 containing 2.5% $Al_2O_3$ also has an acceptable liquidus temperature and viscosity.

Generally, the compositions having the highest concentration of $B_2O_3$ have the lowest liquidus temperatures (Examples 8, 12, 13, and 16). However, the higher $B_2O_3$ concentrations used in the present invention are generally less than the $B_2O_3$ concentrations used in the prior art.

Unexpectedly, higher durabilities were achieved for compositions in which MgO and/or CaO were substituted for $B_2O_3$ (Examples 17 and 5, as compared with Examples 16 and 4, respectively). In addition, the highest durability was achieved in the composition of Example 17, which contained only 2.1% of $Al_2O_3$ and had an increased CaO content and correspondingly decreased $B_2O_3$ content compared to Example 16.

Those of ordinary skill in the art will appreciate that a number of modifications and variations that can be made to specific compositions of the present invention without departing from the scope of the present invention. Such modifications and variations are intended to be covered by the foregoing specification and the following claims.

What is claimed is:

1. A glass fiber composition comprising the following ingredients in weight percent:

$SiO_2$ 49–54;
$Al_2O_3$ 2–3;
$B_2O_3$ 5.5–15;
$Na_2O$ 16–22;
$K_2O$ 0–2;
MgO greater than 0–8;
CaO 7–14; and
CaO+MgO>14 wherein said composition has a liquidus temperature <1800° F., has a viscosity at said liquidus temperature >300 Poise, exhibits a viscosity of 1000 Poise at a temperature of ≦1671° F. and satisfies the equation:

$$(B_2O_3+Na_2O+K_2O+MgO+CaO)-2*Al_2O_3 \geq 40$$

2. The composition of claim 1, wherein the $B_2O_3$ content ranges from 6–15.

3. The composition of claim 1, wherein said ingredients include:

$SiO_2$ 49–54;
$Al_2O_3$ 2–3;
$B_2O_3$ 6–12;
$Na_2O$ 16–22;
$K_2O$ 0–2;
MgO greater than 0–8; and,
CaO 8–14.

4. The composition of claim 3, wherein said ingredients include:

$SiO_2$ 50–53.5;
$Al_2O_3$ 2.1–2.9;
$B_2O_3$ 7–12;
$Na_2O$ 18–21;
$K_2O$ 0–1.5;
MgO greater than 0–6.0; and,
CaO 9–14.

5. The composition of claim 4, wherein said ingredients include:

$SiO_2$ 51–53.5;
$Al_2O_3$ 2.1–2.6;
$B_2O_3$ 7–11;
$Na_2O$ 19–21;
$K_2O$ 0–1.5;
MgO greater than 0–6; and
CaO 9–14.

6. The composition of claim 3, wherein said ingredients include:

$SiO_2$ 50–53.5;
$Al_2O_3$ 2.1–2.9;
$B_2O_3$ 7–12;
$Na_2O$ 18–21;
$K_2O$ 0–1.5;
MgO 2–6; and,
CaO 9–13.

7. The composition of claim 6, wherein said ingredients include:

$SiO_2$ 51–53.5;
$Al_2O_3$ 2.1–2.6;
$B_2O_3$ 7–11;
$Na_2O$ 19–21;
$K_2O$ 0–1.5;
MgO 3–6; and
CaO 9–12.

8. The composition of claim 7, wherein said $B_2O_3$ ranges from 7–<10 weight % of the composition.

9. The composition of claim 7, wherein the quantity $(Na_2O+K_2O)>19.0$ weight % of the composition.

10. The composition of claim 1, wherein said ingredients include:

$SiO_2$ 49–54;
$Al_2O_3$ 2–3;
$B_2O_3$ 10–15;
$Na_2O$ 16–22;
$K_2O$ 0–2;
MgO greater than 0–8; and
CaO 7–14, wherein said composition has a liquidus temperature <1650° F. and a viscosity at said liquidus temperature >1000 Poise.

11. The composition of claim 10, wherein said ingredients include:

$SiO_2$ 50–53.5;
$Al_2O_3$ 2.1–2.9;
$B_2O_3$ 11–14;
$Na_2O$ 18–21;
$K_2O$ 0–1.5;

MgO 2–8; and,
CaO 7–14.

12. The composition of claim 11, wherein said ingredients include:
SiO$_2$ 51–53.5;
Al$_2$O$_3$ 2.1–2.6;
B$_2$O$_3$ 11–13.5;
Na$_2$O 19–21;
K$_2$O 0–1.5;
MgO 3–8; and
CaO 7–12.

13. The composition of claim 10, wherein said ingredients include:
SiO$_2$ 50–53.5;
Al$_2$O$_3$ 2.1–2.9;
B$_2$O$_3$ 11–14;
Na$_2$O 18–21;
K$_2$O 0–1.5;
MgO greater than 0–8; and
CaO 7–14.

14. The composition of claim 13, wherein said ingredients include:
SiO$_2$ 51–53.5;
Al$_2$O$_3$ 2.1–2.6;
B$_2$O$_3$ 11.0–13.5;
Na$_2$O 19–21;
K$_2$O 0–1.5;
MgO greater than 0–8; and
CaO 7–14.

15. A glass fiber composition comprising in weight percent:
SiO$_2$ 49–54;
Al$_2$O$_3$ 2–3;
B$_2$O$_3$ 6–15;
Na$_2$O 16–22;
K$_2$O 0–2;
MgO greater than 0–8;
CaO 7–14; and
CaO+MgO>14
wherein said composition has a liquidus temperature <1800° F., a has viscosity at said liquidus temperature >300 Poise, exhibits a viscosity of 1000 Poise at a temperature of ≦1671° F. and satisfies the equation:

$$(B_2O_3+Na_2O+K_2O+MgO+CaO)-2*Al_2O_3 \geq 40$$

16. The composition of claim 15, wherein said composition includes:
SiO$_2$ 49–54;
Al$_2$O$_3$ 2–3;
B$_2$O$_3$ 6–12;
Na$_2$O 16–22;
K$_2$O 0–2;
MgO greater than 0–8; and,
CaO 8–14.

17. The composition of claim 15, wherein said ingredients include:
SiO$_2$ 49–54;
Al$_2$O$_3$ 2–3;
B$_2$O$_3$ 10–15;
Na$_2$O 16–22;
K$_2$O 0–2;
MgO greater than 0–8; and
CaO 7–14,
wherein said composition has a liquidus temperature <1650° F. and a viscosity at said liquidus temperature >1000 Poise.

18. A method of preparing a glass fiber comprising:
providing a composition comprising, in weight percent:
SiO$_2$ 49–54;
Al$_2$O$_3$ 2–3;
B$_2$O$_3$ 6–15;
Na$_2$O 16–22;
K$_2$O 0–2;
MgO greater than 0–8;
CaO 7–14; and
CaO+MgO>14
wherein said composition has a liquidus temperature <1800° F., a viscosity at said liquidus temperature >300 Poise, exhibits a viscosity of 1000 Poise at a temperature of ≦1671° F. and satisfies the equation:

$$(B_2O_3+Na_2O+K_2O+MgO+CaO)-2*Al_2O_3 \geq 40;$$

heating the composition to at least its liquidus temperature to produce a molten composition; and,
forming the glass fiber from the molten composition.

19. The method of claim 18, wherein said forming includes forming the glass fiber by a rotary process.

20. The method of claim 18, wherein said providing includes providing a composition comprising in weight percent:
SiO$_2$ 49–54;
Al$_2$O$_3$ 2–3;
B$_2$O$_3$ 6–12;
Na$_2$O 16–22;
K$_2$O 0–2;
MgO greater than 0–8; and,
CaO 8–14.

21. The method of claim 18, wherein said providing includes providing a composition comprising in weight percent:
SiO$_2$ 49–54;
Al$_2$O$_3$ 2–3;
B$_2$O$_3$ 10–15;
Na$_2$O 16–22;
K$_2$O 0–2;
MgO greater than 0–8; and
CaO 7–14,
wherein the composition has a liquidus temperature <1650° F. and a viscosity at the liquidus temperature >1000 Poise.

* * * * *